(12) United States Patent
Berg

(10) Patent No.: US 10,332,395 B1
(45) Date of Patent: Jun. 25, 2019

(54) SYSTEM AND METHOD FOR TRANSLATING ROADSIDE DEVICE POSITION DATA ACCORDING TO DIFFERENTIAL POSITION DATA

(71) Applicant: DENSO International America, Inc., Southfield, MI (US)

(72) Inventor: Roger Berg, Carlsbad, CA (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/849,895

(22) Filed: Dec. 21, 2017

(51) Int. Cl.
| | |
|---|---|
| *G08G 1/0967* | (2006.01) |
| *G08G 1/01* | (2006.01) |
| *G01S 19/42* | (2010.01) |
| *H04W 4/44* | (2018.01) |
| *G01S 19/41* | (2010.01) |

(52) U.S. Cl.
CPC ........ *G08G 1/096783* (2013.01); *G01S 19/41* (2013.01); *G01S 19/42* (2013.01); *G08G 1/0116* (2013.01); *G08G 1/096725* (2013.01); *H04W 4/44* (2018.02); *G01S 2205/002* (2013.01)

(58) Field of Classification Search
CPC .......... G08G 1/0116; G08G 1/096725; G08G 1/096783; G01S 19/41; G01S 19/42; G01S 2205/002; H04W 4/44
USPC ...... 340/906–932.1; 701/445, 469, 471, 485, 701/495, 520
See application file for complete search history.

(56) References Cited

U.S. PATENT DOCUMENTS

| | | |
|---|---|---|
| 4,989,151 A | 1/1991 | Nuimura |
| 5,270,937 A | 12/1993 | Link et al. |
| 5,317,515 A | 5/1994 | Matsuzaki |
| 5,323,152 A | 6/1994 | Morita |
| 5,523,761 A * | 6/1996 | Gildea .................... G01S 19/36 266/207 |
| 5,539,398 A | 7/1996 | Hall et al. |
| 5,852,791 A | 12/1998 | Sato et al. |
| 5,926,113 A | 7/1999 | Jones et al. |
| 5,995,023 A | 11/1999 | Kreft |
| 6,307,505 B1 | 10/2001 | Green |
| 6,345,229 B1 | 2/2002 | Honkomp et al. |
| 6,370,475 B1 | 4/2002 | Breed et al. |
| 6,658,353 B2 | 12/2003 | Shimizu et al. |
| 6,931,322 B2 | 8/2005 | Jung et al. |
| 7,071,843 B2 | 7/2006 | Hashida et al. |

(Continued)

FOREIGN PATENT DOCUMENTS

| | | |
|---|---|---|
| EP | 1662230 A1 | 5/2006 |
| WO | WO-2005024346 A1 | 3/2005 |
| WO | WO-2010073113 A1 | 7/2010 |

*Primary Examiner* — Brian Wilson
(74) *Attorney, Agent, or Firm* — Harness, Dickey & Pierce, P.L.C.

(57) ABSTRACT

In an example, a roadside device is disclosed. In one or more implementations, the roadside device includes a deviation determination module that is configured to determine a difference between a determined current position of the roadside device and a predefined position of the roadside device. The roadside device also includes a modification module that is configured to modify geometry data representing an intersection environment based upon the difference, and a vehicle-to-everything (V2X) communication module that is configured to broadcast the modified geometry data within the intersection environment.

19 Claims, 6 Drawing Sheets

(56) References Cited

U.S. PATENT DOCUMENTS

| | | |
|---|---|---|
| 7,197,392 B2 | 3/2007 | Lee et al. |
| 7,840,355 B2 | 11/2010 | Breed et al. |
| 7,899,621 B2 | 3/2011 | Breed et al. |
| 7,990,283 B2 | 8/2011 | Breed |
| 8,489,316 B1 | 7/2013 | Hedges et al. |
| 8,560,235 B2 | 10/2013 | Okuyama et al. |
| 2014/0306833 A1* | 10/2014 | Ricci ................. B60Q 1/00 340/901 |
| 2015/0149073 A1 | 5/2015 | Ishigami et al. |
| 2015/0192427 A1 | 7/2015 | Choi |
| 2015/0300826 A1 | 10/2015 | Hayashi |
| 2016/0139272 A1 | 5/2016 | Basnayake |
| 2018/0018877 A1* | 1/2018 | Townsend .............. G08G 1/056 |

\* cited by examiner

SYSTEM AND METHOD FOR TRANSLATING ROADSIDE DEVICE POSITION DATA ACCORDING TO DIFFERENTIAL POSITION DATA

FIELD

The present disclosure relates to systems and methods for translating roadside device position data according to differential position data and, in particular, to systems and methods for translating roadside device position data at intersections to differential position data.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Many devices, including vehicles, include navigation systems that use satellite-transmitted data to determine their latitude, longitude, and altitude. For example, in the United States, the Global Positioning System (GPS) is one example of these types of satellite navigation systems that collectively known as Global Navigation Satellite Systems (GNSS). These devices can use the location data for navigation purposes, determining its current position, and the like.

SUMMARY

In an example, a roadside device is disclosed. In one or more implementations, the roadside device includes a deviation determination module that is configured to determine a difference between a determined current position of the roadside device and a predefined position of the roadside device. The roadside device also includes a modification module that is configured to modify geometry data representing an intersection environment based upon the difference, and a vehicle-to-everything (V2X) communication module that is configured to broadcast the modified geometry data within and/or around the intersection environment.

In another example, a method is disclosed. In an example implementation, the method includes determining a difference between a determined current position of the roadside device and a predefined position of a roadside device and modifying geometry data representing an intersection environment based upon the difference. The method also includes broadcasting the modified geometry data within and/or around the intersection environment.

In another example, a system is disclosed. In an example implementation, the system includes a roadside device configured to be positioned proximate to an intersection environment. The roadside device includes a deviation determination module that is configured to determine a difference between a determined current position of the roadside device and a predefined position of the roadside device, a modification module that is configured to modify geometry data representing the intersection environment based upon the difference. The roadside device also includes a vehicle-to-everything (V2X) communication module that is configured to broadcast the modified geometry data within and/or around the intersection environment. The modified geometry data is configured to be received at a vehicle-to-everything (V2X) communication module of one or more vehicles.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
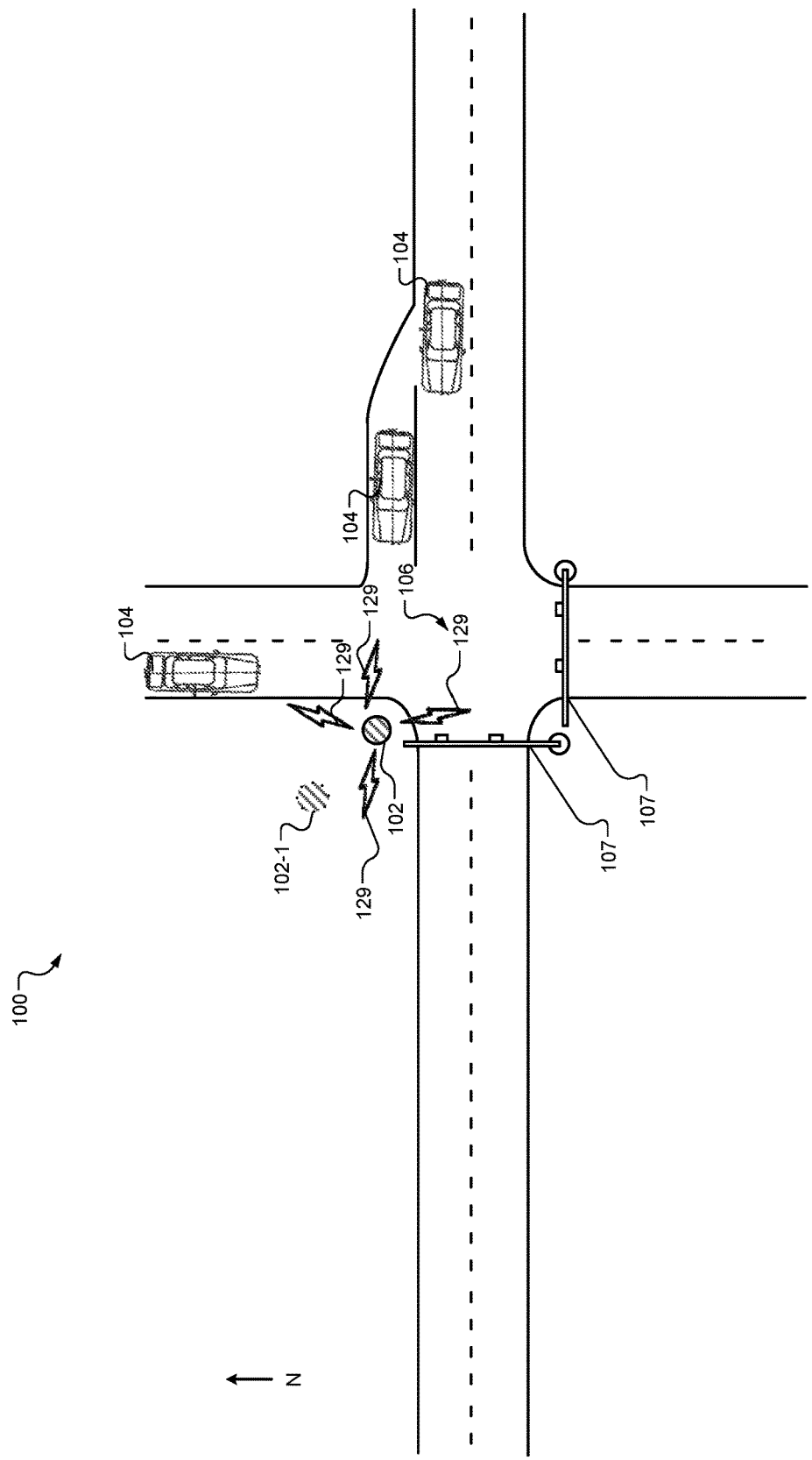
FIG. 1A illustrates an example signalized intersection environment according to an example implementation of the present disclosure.

Vehicles have increasingly begun to employ vehicle-to-vehicle (V2V) and vehicle-to-infrastructure (V2I) communications, collectively known as V2X, for communication purposes. For example, V2X communications include one or more communication networks in which vehicles and roadside devices are the communicating nodes that provide one another with information, such as safety warnings and traffic information. V2X communications allow vehicles to communicate with other vehicles, infrastructure, and/or pedestrians, using wireless communications technologies, such as, but not limited to, Dedicated Short Range Communications (DSRC).

Intelligent transportation systems (ITS) can use V2X services within and/or around intersection environments, such as signalized intersection environments. For example, the V2X services may use survey level map representations of the intersections to allow vehicles to locate themselves with respect to the different approach lanes. As a vehicle approaches the intersections, traffic control systems signals broadcast signals, such as Signal Phase and Timing (SPaT) messages, to provide traffic signal information to approaching vehicles. However, some intersections include multiple turning lanes. Thus, the traffic signals broadcast different SPaT message elements (e.g., signals) pertaining to each approach lane.

In order to distinguish among the SPaT message elements, the vehicle determines its location within the signalized intersection. The vehicle then compares the determined location with the data representing the survey level map representation to determine the lane in which the vehicle is traveling. Based upon the determined approach lane, the vehicle can determine the SPaT message element corresponding to the approach lane.

However, certain physical phenomenon, such as atmospheric conditions (i.e., atmospheric scintillation, etc.), can modify the GNSS accuracy of the roadside device and/or the vehicle. Thus, the roadside device broadcasts both the data representing the signalized intersection and Radio Technical Commission for Maritime Services (RTCM) correction signals to improve geospatial location accuracy. Additionally, the GNSS receiver of the vehicle must be capable of receiving the RTCM signals and processing the RTCM signals accordingly to improve the determined location of the vehicle based upon the vehicle's trajectory and the data representing the signalized intersection.

In some intersection environments, traffic signs are used to control traffic flow. For example, intersections can include stop signs notifying drivers to stop prior to proceeding through the intersection. These intersection environments may include marked pedestrian crossings signifying an area for pedestrians to cross the road. The pedestrian crossings can include stop bars (e.g., stop lines) indicating where motorists are to stop. Roadside devices can be used to broadcast data indicative of its position to allow a vehicle control system to determine the vehicle position with respect to the stop lines. However, as described above, the atmospheric conditions can modify the GNSS accuracy of the roadside device and/or the vehicle.

Accordingly, a roadside device that broadcasts modified data representing geometrical parameters of an intersection environment is disclosed. In one or more implementations, the roadside device includes a deviation determination module that is configured to determine a difference between a determined current position of the roadside device and a predefined position of the roadside device. The roadside device also includes a modification module that is configured to modify geometry data representing an intersection environment based upon the difference and a vehicle-to-everything (V2X) communication module that is configured to broadcast the modified geometry data within and/or around the signalized intersection. In using the roadside device of the present disclosure, the GNSS receiver of the vehicle does not have to be capable of receiving and/or processing the RTCM signals.

Figure 1B:
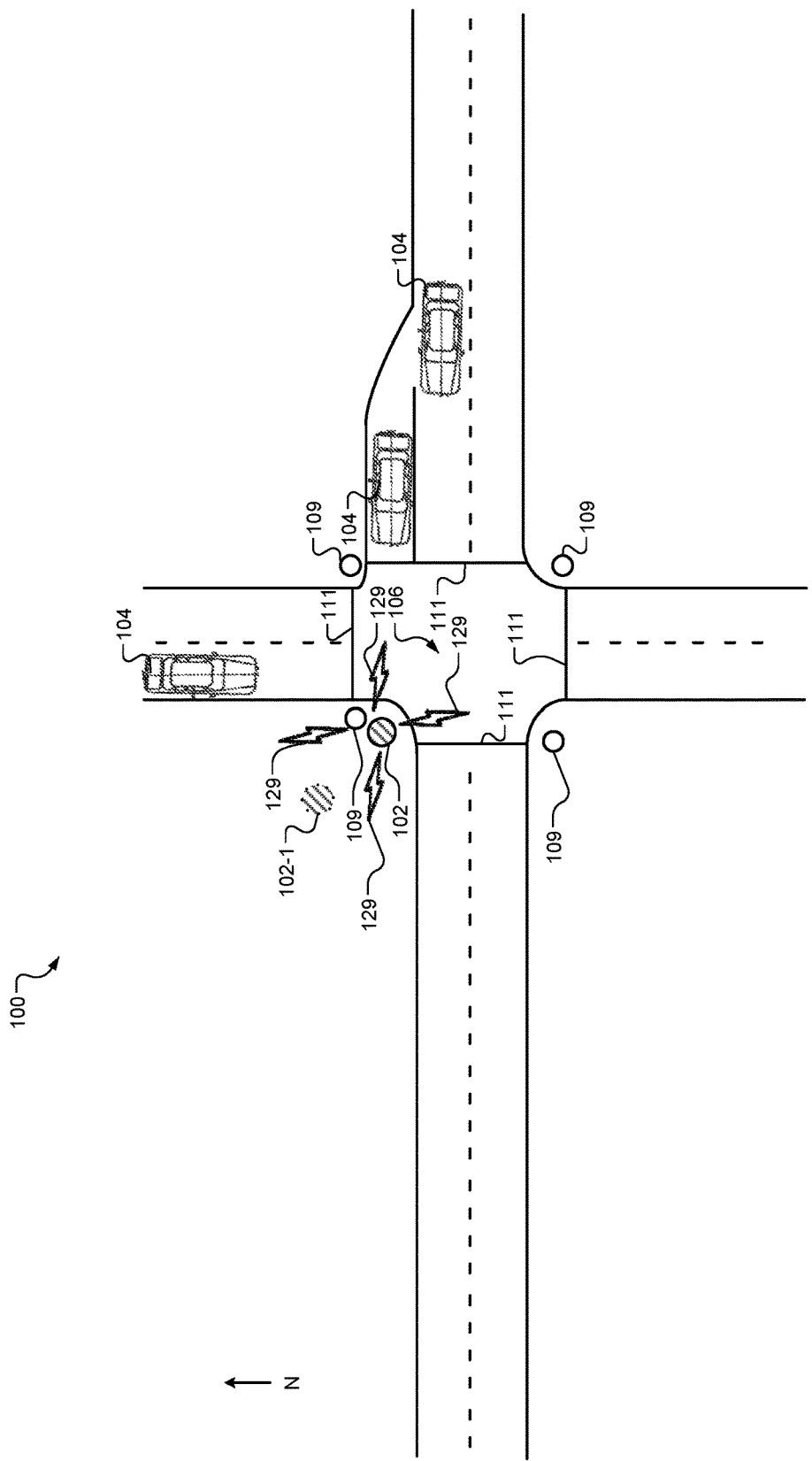
FIGS. 1B and 1C illustrate an example non-signalized intersection environment according to an example implementation of the present disclosure.
Figure 1C:
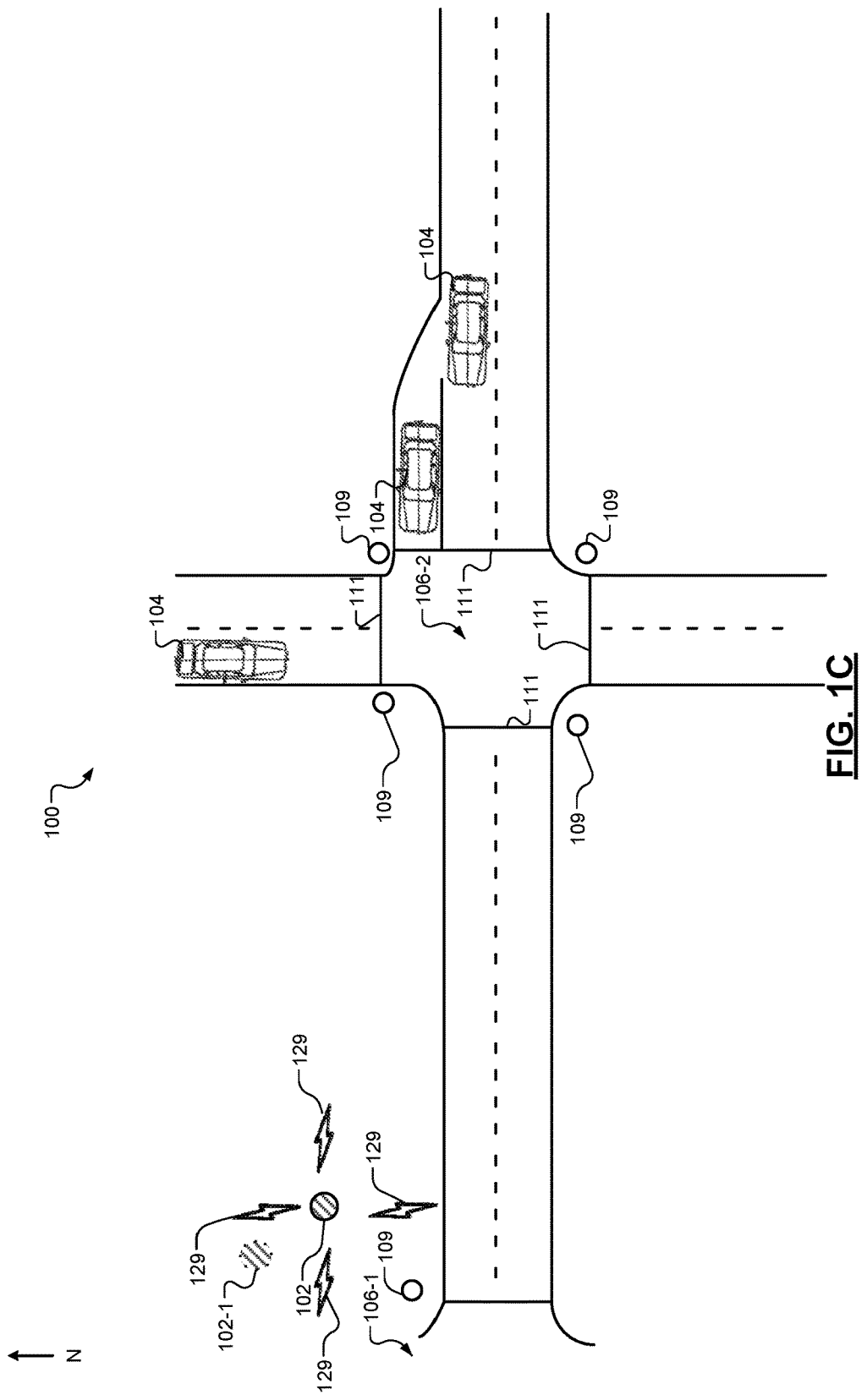

FIGS. 1A through 1C illustrate example environments 100 that include a roadside device 102 that can modify geometry data, or MAP data, and broadcasts the modified geometry data. The roadside device 102 may include one or more stationary roadside devices that broadcast data representing geometry data. The geometry data can represent surveyed data, including latitude, longitude, and/or altitude parameters representing a signalized intersection environment. One or more vehicles 104 proximate to an intersection 106 receive the modified geometry data. In the example environment shown in FIG. 1A, the intersection 106 includes a signalized intersection that includes one or more traffic signals 107. In the example environment shown in FIGS. 1B and 1C, the intersection 106 includes an intersection including one or more traffic signs 109 and stop lines 111.

Figure 2:
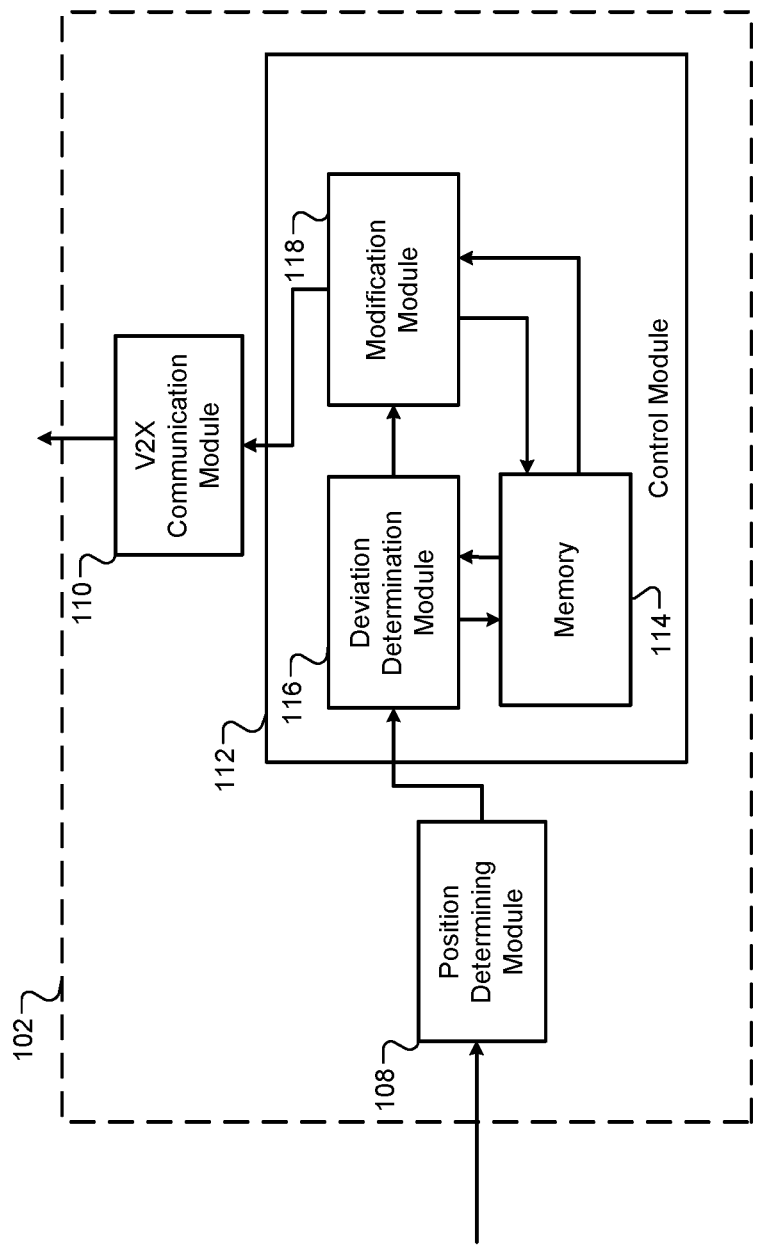
FIG. 2 illustrates an example block diagram of a roadside device according to an example implementation of the present disclosure.
Figure 3:
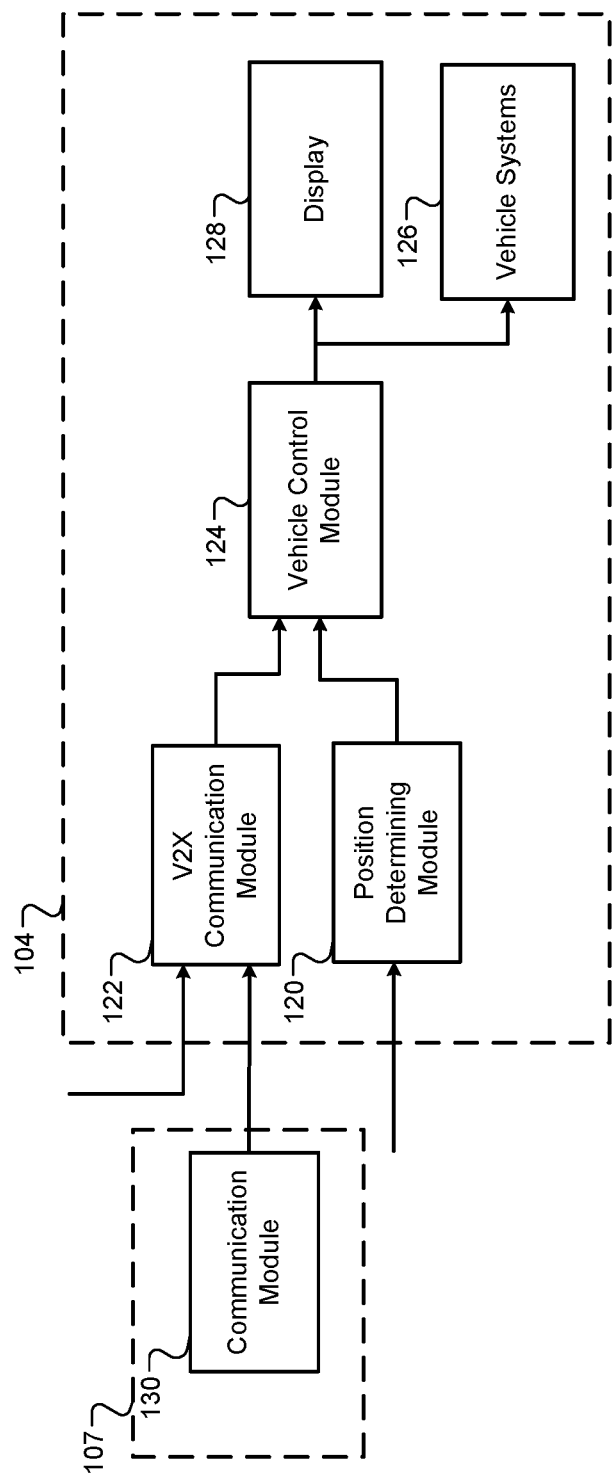
FIG. 3 illustrates an example block diagram of a vehicle according to an example implementation of the present disclosure.

FIG. 2 illustrates an example block diagram of the roadside device 102 that communicates with a vehicle 104. The roadside device 102 includes a position determining module 108, a V2X communication module 110, and a control module 112. The control module 112 includes a memory 114, a deviation determination module 116, and a modification module 118. Referring to FIG. 3, the vehicle 104 can include a position determining module 120, a V2X communication module 122, a vehicle control module 124, vehicle systems 126, and a display 128.

In one or more implementations, the vehicle systems 126 can include a powertrain system, a steering system, and/or a braking system. For example, the vehicle systems 126 include the systems and/or components that operate the vehicle 104. It is understood that the vehicle systems 126 may include any number of additional vehicle systems that can operate the vehicle. It is understood that the vehicle systems 126 used herein can be used within an autonomous vehicle.

The roadside device 102 can represent a communication node that enables vehicle-to-everything (V2X) communication. In one example, the roadside device 102 is positioned within an intersection 106, such as a signalized intersection (see FIG. 1A) or a non-signalized intersection (see FIGS. 1B and 1C), environment that broadcasts information to the vehicle 104. For instance, the information provided by the roadside device 102 includes geometry data, such as position coordinates corresponding to one or more portions of the roadway or landmarks within the intersection 106. The position coordinates can be represented by latitude, longitude, altitude parameters, and/or any other similar location description data related to three-dimensional spaces.

The roadside device 102 communicates with vehicles 104 via a communication network 129. The communication network 129 may comprise a variety of different types of networks and connections that are contemplated, including, but not limited to: the Internet; an intranet; a satellite network; a cellular network; a mobile data network; wired and/or wireless connections; and so forth. Examples of wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; Dedicated Short Range Communications (DSRC); Cellular/LTE/5G; and so on.

The position determining modules 108, 120 generate respective GNSS signals identifying a location of the roadside device 102 and the vehicle 104, respectively. In various implementations, the position determining module 108, 120 each include a GNSS transceiver for communicating with GNSS satellites.

Referring to FIG. 2, the roadside device 102 communicates with GNSS communication systems, such as GNSS satellites, via the position determining module 108 to determine a current position (i.e., a current positional reading) of the roadside device 102. The position determining module 108 determines the current position of the roadside device 102 based upon the GNSS signals and provides a signal indicative of the current position to the deviation determination module 116.

The deviation determination module 116 determines whether the current position (i.e., current positional reading) matches a predefined position of the roadside device 102. The predefined position may represent a surveyed position of the roadside device 102 (i.e., a surveyed position corresponding to the position determining module 108). The predefined position can be stored in the memory 114 and accessed by the deviation determination module 116. In an implementation, the deviation determination module 116 compares the current position with the predefined position to determine a difference between current position and the predefined position. For example, the difference includes a differential vector representative (e.g., a differential vector reference) of the change in latitude, the change in longitude, and/or the change in altitude between the predefined position and the current position. In one example, the current positional reading may indicate that the current coordinates of the roadside device 102 are North and West of the predefined position, as referenced by the roadside device 102-1.

In an implementation, the deviation determination module 116 provides a difference signal indicative of the difference (i.e., the differential vector) between the current position and the predefined position to the modification module 118. The modification module 118 modifies the geometry data according to the determined difference between the current position and the predefined position. The geometry data represents the surveyed intersection 106 including the roadside device 102 at the predefined position. For example, the modification module 118 accesses the geometry data from the memory 114 and modifies the geometry data based upon the determined difference.

In an implementation, the geometry data is modified (i.e., translated, etc.) such that the coordinates of the geometry data are modified according to the differential vector. For example, each latitude coordinate is modified based upon the difference in latitude coordinates of the current position and the predefined position; each longitude coordinate is modified based upon the difference in longitude coordinates of the current position and the predefined position; and each altitude coordinate is modified based upon the difference in altitude coordinates of the current position and the predefined position. Thus, the modified coordinates of the modified intersection data correspond to the current position of the roadside device 102, and the surveyed coordinates of the non-modified intersection data correspond to the predefined position of the roadside device 102. The modification module 118 provides the modified intersection data to the V2X communication module 110.

The V2X communication module 110 broadcasts the modified geometry data via the communication network 129. Vehicles 104 within the intersection 106 receive the broadcasted modified geometry data, and the vehicles 104 can use the modified geometry data to localize to a given single lane approach and/or the stop lines 111.

In non-signalized intersection environments (see FIGS. 1B and 1C), the roadside device 102 broadcasts modified geometry data. Vehicles 104 can use the modified data to determine proximity of the vehicle 104 with respect to traffic markers, such as stop lines 111. In some implementations, the roadside device 102 can broadcast modified geometry data relating to multiple intersections 106 within the intersection environment. For example, with respect to FIG. 1C, the roadside device 102 can broadcast modified geometry data pertaining to a first intersection 106-1 and a second intersection 106-2. Vehicles 104 proximate to the second intersection 106-2 can use the modified geometry data broadcast from the roadside device 102 to determine proximity of the vehicle to traffic markers within the second intersection 106-2. In this implementation, the roadside device 102 is located proximate to the first intersection 106-1 and distal to the second intersection 106-2.

Referring to FIG. 3, the V2X communication module 122 receives the modified geometry data and provides this data to the vehicle control module 124. The position determining module 120 communicates with the GNSS communication system to determine a current position (i.e., current positional reading) of the vehicle 104 and is provided to the vehicle control module 124. The vehicle control module 124 determines the lane approach according to the geometry data and the current positional reading of the vehicle 104.

The V2X communication module 122 receives signal phase and timing (SPaT) signals transmitted by the traffic signal 107. For example, the traffic signal 107 includes a communication module 130 that receives SPaT signals from a traffic signal 107 controller and broadcasts the SPaT signals to vehicles approaching the signalized intersection 106. The communication module 130 can transmit the SPaT signals via the communication network 129. Based upon the determined lane approach, the vehicle control module 124 can determine the SPaT signal corresponding to the determined lane approach provided by a traffic signal 107.

Based upon the determined SPaT signal, the vehicle control module 124 can operate one or more aspects of the vehicle 104. For example, the vehicle control module 124 can generate and transmit a control signal to one or more vehicle systems 126 to operate the vehicle 104 accordingly. For instance, the control signal may actuate the braking system causing the vehicle 104 to brake, actuate the steering system causing the vehicle 104 to turn, and/or actuate the powertrain system to cause the vehicle 104 to accelerate. However, it is understood that the any number of control signals to operate various vehicle systems 126 can be generated to cause the vehicle 104 to operate accordingly.

The vehicle control module 124 can also generate a display control signal to cause the display 128 to display information pertaining to the intersection 106. In one example, the vehicle control module 124 generates the display control signal to display a warning at the display 128. In another example, the vehicle control module 124 generates the display control signal to display traffic signal 107 information. The traffic signal 107 information may include timing information of how long the current operational lane traffic signal is going to maintain its current signal state, timing information indicating a time length that the next state of operational lane traffic signal will maintain that state, and the like.

Figure 4:
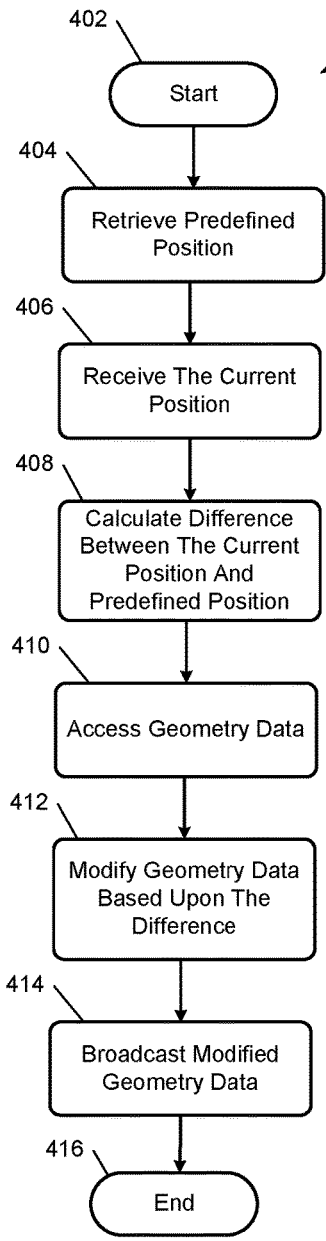
FIGS. 4 and 5 illustrate example flow diagrams of methods according to example implementations of the present disclosure.

FIG. 4 illustrates an example method 400 for modifying geometry data in accordance with an example implementation of the present disclosure. The method begins at 402. At 404, the predefined position of the roadside device 102 is retrieved. At 406, deviation determination module 116 receives the determined current position of the roadside device 102. At 408, the deviation determination module 116 calculates the difference between the current position and the predefined position of the roadside device 102.

At 410, the modification module 118 accesses the geometry data from the memory 114. At 412, the modification module 118 modifies the geometry data based upon the difference. At 414, the V2X communication module 110 broadcasts the modified geometry data within the signalized intersection environment 100. At 416, the method ends.

Figure 5:
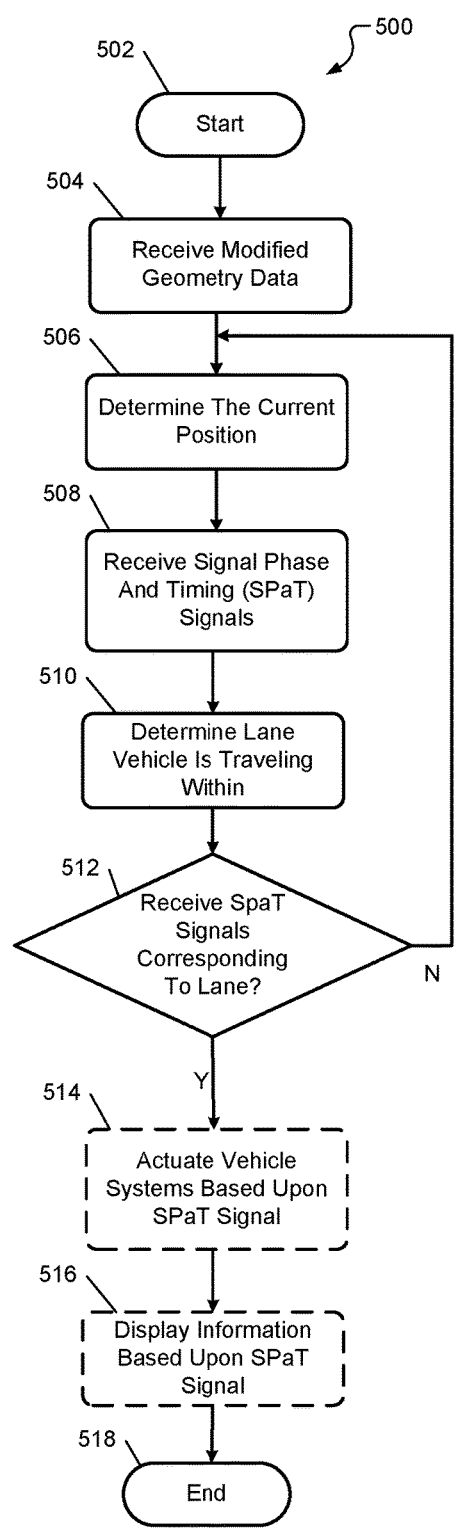

FIG. 5 illustrates an example method 500 for receiving the modified geometry data at a vehicle 104 within a signalized intersection environment. At 502, the method starts. At 504, the V2X communication module 122 receives the modified geometry data broadcast from a roadside device 102. At 506, the position determining module 120 determines the current position of the vehicle 104 based upon the signals received from the GNSS satellites. At 508, the V2X communication module 122 receives SPaT signals broadcast from the communication module 130 of one or more traffic signals 107 located within the intersection 106.

At 510, the vehicle control module 124 determines the lane (i.e., roadway) the vehicle is traveling within. For example, the vehicle control module 124 compares the current position determined by the position determining module 120 with the modified geometry data received by the V2X communication module 122. Based upon the comparison, the vehicle control module 124 determines, or identifies, the lane in which the vehicle 104 is travelling. At 512, the vehicle control module 124 determines whether any SPaT signals have been received corresponding to the identified lane.

The method returns to 506 when the vehicle control module 124 determines that no SPaT signals corresponding to the identified lane have been received. At 514, the vehicle control module 124 may actuate the vehicle systems 126 based upon the received SPaT signal. For example, the vehicle control module 124 generates and transmits a control signal to the vehicle systems 126 to control one or more operational aspects of the vehicle 104. At 516, the vehicle control module 124 causes the display 128 to display information based upon the SPaT signals. For example, the vehicle control module 124 generates and transmits a display control signal to cause the display 128 to display information pertaining to the intersection 106. The method ends at 518.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A roadside device comprising:
a position determining module that is configured to determine a current position of the roadside device based on signals received from Global Navigation Satellite System satellites;
a deviation determination module that is configured to compare the determined current position of the roadside device with a predefined position of the roadside device to determine a differential vector representing a difference between the determined current position of the roadside device and the predefined position of the roadside device;
a modification module that is configured to modify geometry data that includes position coordinates of an intersection environment to generate modified position coordinates of the intersection environment according to the differential vector; and
a vehicle-to-everything (V2X) communication module that is configured to broadcast the modified position coordinates of the intersection environment to at least one vehicle within the intersection environment.

2. The roadside device as recited in claim 1, wherein the position determining module includes a Global Navigation Satellite Systems transceiver.

3. The roadside device as recited in claim 1, wherein vehicle-to-everything communication module is further configured to broadcast the modified position coordinates within the intersection environment via a wireless communications protocol.

4. The roadside device as recited in claim 1, wherein the differential vector includes at least one of a) a difference in latitude between a latitude coordinate of the current position and a latitude coordinate of the predefined position; b) a difference in longitude between a longitude coordinate of the current position and a longitude coordinate of the predefined position; or c) a difference in an altitude between an altitude coordinate of the current position and an altitude coordinate of the predefined position.

5. The roadside device as recited in claim 1, further comprising a memory that is configured to store the predefined position and the geometry data.

6. The roadside device as recited in claim 1, wherein the intersection environment includes a signalized intersection environment and the predefined position includes surveyed parameters of the roadside device and the geometry data includes surveyed parameters corresponding to the signalized intersection environment.

7. The roadside device as recited in claim 1, wherein the position coordinates of the intersection environment include position coordinates of at least one of a portion of a roadway of the intersection environment, a stop line of the intersection environment, and a traffic signal of the intersection environment.

8. A method comprising:
determining a current position of a roadside device based on signals received from Global Navigation Satellite System satellites;
comparing the determined current position of the roadside device with a predefined position of the roadside device to determine a differential vector representing a difference between the determined current position of the roadside device and the predefined position of the roadside device;
modifying geometry data that includes position coordinates of an intersection environment to generate modified position coordinates of the intersection environment according to the differential vector; and
broadcasting the modified position coordinates of the intersection environment to at least one vehicle within the intersection environment.

9. The method as recited in claim 8, wherein the signals from the Global Navigation Satellite System satellites are received with a Global Navigation Satellite Systems transceiver.

10. The method as recited in claim 8, wherein broadcasting the modified position coordinates within the intersection environment is performed via a wireless communications protocol.

11. The method as recited in claim 8, wherein the a differential vector includes at least one of a) a difference in latitude between a latitude coordinate of the current position and a latitude coordinate of the predefined position; b) a difference in longitude between a longitude coordinate of the current position and a longitude coordinate of the predefined position; or c) a difference in an altitude between an altitude coordinate of the current position and an altitude coordinate of the predefined position.

12. The method as recited in claim 8, further comprising accessing the predefined position and the geometry data from a memory.

13. The method as recited in claim 8, wherein intersection environment includes a signalized intersection environment and the predefined position includes surveyed parameters of the roadside device and the geometry data includes surveyed parameters corresponding to the signalized intersection.

14. The method as recited in claim 8, wherein the position coordinates of the intersection environment include position coordinates of at least one of a portion of a roadway of the intersection environment, a stop line of the intersection environment, and a traffic signal of the intersection environment.

15. A system comprising:

a roadside device configured to be positioned proximate to a signalized intersection, the roadside device including:
- a position determining module that is configured to determine a current position of the roadside device based on signals received from Global Navigation Satellite System satellites;
- a deviation determination module that is configured to compare the determined current position of the roadside device with a predefined position of the roadside device to determine a differential vector representing a difference between the determined current position of the roadside device and the predefined position of the roadside device;
- a modification module that is configured to modify geometry data that includes position coordinates of the signalized intersection to generate modified position coordinates of the signalized intersection according to the differential vector; and
- a vehicle-to-everything (V2X) communication module that is configured to broadcast the modified position coordinates of the signalized intersection to at least one vehicle within the signalized intersection,
- wherein the modified position coordinates of the signalized intersection are received a vehicle-to-everything (V2X) communication module of the at least one vehicle.

16. The system as recited in claim 15, wherein the vehicle further includes:

a vehicle control module that is configured to identify a lane that the vehicle is traveling within based upon a determined current position of the vehicle and the modified geometry coordinates, wherein the vehicle control module is further configured to identify a signal phase and timing signal corresponding to the identified lane that is broadcast from a traffic signal of the signalized intersection.

17. The system as recited in claim 16, wherein the vehicle control module is further configured to actuate a vehicle system of the vehicle based upon the signal phase and timing signal.

18. The system as recited in claim 16, wherein the vehicle control module is further configured to cause a display of the vehicle to display traffic signal information based upon the signal phase and timing signal.

19. The system as recited in claim 15, wherein the position coordinates of the signalized intersection include position coordinates of at least one of a portion of a roadway of the signalized intersection, a stop line of the signalized intersection, and a traffic signal of the signalized intersection.

* * * * *

UNITED STATES PATENT AND TRADEMARK OFFICE
CERTIFICATE OF CORRECTION

PATENT NO. : 10,332,395 B1
APPLICATION NO. : 15/849895
DATED : June 25, 2019
INVENTOR(S) : Roger Berg Page 1 of 1

It is certified that error appears in the above-identified patent and that said Letters Patent is hereby corrected as shown below:

On the Title Page

Column 1, after (22) Filed, Line 1: "2017", insert --¶(65) Prior Publication Data
US 2019/0197893 A1 Jun. 27, 2019--

In the Claims

Column 11, Line 25: In Claim 15, after "received", insert --by--

Signed and Sealed this
Twenty-sixth Day of May, 2020

Andrei Iancu
*Director of the United States Patent and Trademark Office*